(12) United States Patent  (10) Patent No.: US 8,174,726 B2
Shingai  (45) Date of Patent: May 8, 2012

(54) PRINTING DEVICE, PRINTING METHOD, PRINT SETTING DETERMINATION DEVICE, AND COMPUTER PROGRAM

(75) Inventor: Kosuke Shingai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 531 days.

(21) Appl. No.: 12/415,183

(22) Filed: Mar. 31, 2009

(65) Prior Publication Data
US 2009/0244555 A1  Oct. 1, 2009

(30) Foreign Application Priority Data

Apr. 1, 2008 (JP) .................................. 2008-094957
Feb. 18, 2009 (JP) .................................. 2009-035801

(51) Int. Cl.
G06F 15/00 (2006.01)
G06F 3/12 (2006.01)
G06F 3/00 (2006.01)
H04N 1/40 (2006.01)
H04N 5/225 (2006.01)
H04N 5/228 (2006.01)
H04N 5/222 (2006.01)
G06K 15/00 (2006.01)
G06K 9/00 (2006.01)
G06K 9/46 (2006.01)
B41J 29/38 (2006.01)
B41J 2/165 (2006.01)
G03G 15/16 (2006.01)

(52) U.S. Cl. .......... 358/1.2; 358/448; 358/1.9; 358/1.13; 358/1.18; 382/115; 382/190; 382/181; 382/195; 382/118; 347/31; 347/14; 348/207.1; 348/333.12; 348/222.1; 399/297; 715/741

(58) Field of Classification Search ................... 358/1.2, 358/448, 1.13, 1.18, 1.9; 382/115, 190, 181, 382/195, 118; 348/207.1, 333.12, 222.1; 347/31, 14; 399/297; 715/741
See application file for complete search history.

(56) References Cited

U.S. PATENT DOCUMENTS

2007/0285680 A1* 12/2007 Nakamura ...................... 358/1.2
2008/0278737 A1* 11/2008 Kajihara et al. ............... 358/1.9
2009/0179998 A1* 7/2009 Steinberg et al. .......... 348/222.1

FOREIGN PATENT DOCUMENTS

JP  10-315444  12/1998

* cited by examiner

Primary Examiner — Charlotte M Baker
Assistant Examiner — Rury Grisham
(74) Attorney, Agent, or Firm — DLA Piper LLP (US)

(57) ABSTRACT

There is provided a printing device including a face detection unit for detecting a face area including a face of a person in an image to be a target for printing, and a print setting determination unit for determining a setting of a size of a print image used for a marginless printing based on a position of the face area detected by the face detection unit.

7 Claims, 10 Drawing Sheets

PRINTING DEVICE, PRINTING METHOD, PRINT SETTING DETERMINATION DEVICE, AND COMPUTER PROGRAM

BACKGROUND

1. Technical Field

The present invention relates to a printing device, a printing method, a print setting determination device, and a computer program.

2. Related Art

A recording method has been recently proposed in which a marginless image is formed on an image forming body (for example, print paper for photograph) on which an image can be formed by forming an image recording area so as to be protruded over the entire margin of the image forming body when an image is formed on the image forming body (see JP-A-10-315444).

FIG. 10 is a diagram showing an example of the technique. A rectangle shown by a solid line in FIG. 10 is a frame (printing surface frame 100) of a paper (image forming body) on which an image is printed. A rectangle shown by a broken line in FIG. 10 is a frame (image frame 200) showing a size of an image to be prepared for forming a marginless image. The marginless image can be obtained by printing an image whose size is the same as the image frame 200 larger than the printing surface frame 100 on a paper whose size is the same as the printing surface frame 100. The image whose size is the same as the image frame 200 can be obtained by enlarging an image whose size is the same as the print frame 100.

In the conventional technique, an image in a differential area (disposal area) between the image frame 200 and the printing surface frame 100 is not printed on a paper and is discarded. Accordingly, when a face of a person is positioned in the disposal area, there is a fear that the face of the person may be lacked.

SUMMARY

An advantage of some aspects of the invention is to provided a printing device, a printing method, a print setting determination device, and a computer program which make it possible to restrain that an image in which a face of a person is lacked is printed when a marginless printing is performed.

According to an aspect of the invention, there is provided a printing device including a face detection unit and a print setting determination unit. The face detection unit detects a face area including a face of a person in an image to be a target for printing. The print setting determination unit determines a setting of a size of a print image used for a marginless printing based on a position of the face area detected by the face detection unit. The print image is an image used for a marginless printing, and is an image equal to or larger than a surface on which printing is performed in size.

According to the aspect of the invention, determination is performed based on the position of the detected face area when setting the size of the print image used for a marginless printing. Accordingly, it can be restrained that a face of a person is lacked in a marginless printing.

It is preferable that the print setting determination unit determines the setting so that a size of an overlapped portion of the face area detected by the face detection unit and a disposal area becomes small in the printing device according to the aspect of the invention. the disposal area is a differential area of the print image and a surface on which printing is performed (print surface). A possibility that a part of the image overlapped with the disposal area is not formed on a print surface in the marginless printing. Accordingly, by setting the overlapped portion of the disposal area and the face area so as to be small, it can be restrained that a face of a person is lacked in a marginless printing.

It is preferable that the print setting determination unit determines the setting of the size of the print image as a size closer to a size of the surface on which printing is performed when the face area detected by the face detection unit is included in the disposal area of the print image having a certain size in the printing device according to the aspect of the invention. Since the size of the print image is set as a size closer to a size of the surface on which printing is performed, the size of the print image is further reduced, and the disposal area also becomes small with the reduction. Accordingly, with the constitution, the size of the overlapped portion of the disposal area and the face area becomes small, and it can be restrained that a face of a person is lacked in a marginless printing.

It is preferable that an area setting unit for setting a protection area including a portion which should be printed based on a size of the face area is further included in the printing device according to the aspect of the invention. In this case, the print setting determination unit may be constituted to determine the setting based on a position of the protection area instead of the position of the face area. With the structure, when there is a deviation between the face area and the portion which should be printed, it becomes possible to resolve the deviation and to restrain that a portion which should be printed is lacked in a print image.

It is preferable that the face detection unit performs a detection processing only for a part area including near a margin of the image to be a target for printing in the printing device according to the aspect of the invention. With the structure, a time for requiring for performing a face detection processing can be reduced.

According to another aspect of the invention, there is provided a computer program for operating a computer as the printing device. Further, according to another aspect of the invention, there is provided a printing method in which a computer functions as the printing device. Note that the computer denotes not only a generalized information processing device, but also includes a dedicated hardware or a generalized hardware, for example, mounted in the printing device. Further, the printing device of the aspect of the invention is not limited to an independent device, and means for constituting the printing device of the aspect of the invention may be decentrally provided in a plurality of substantive devices. For example, the printing device of the aspect of the invention may be constituted by a computer and a printer.

With the aspects of the invention, it can be restrained that a face of a person is lacked when a marginless printing is performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
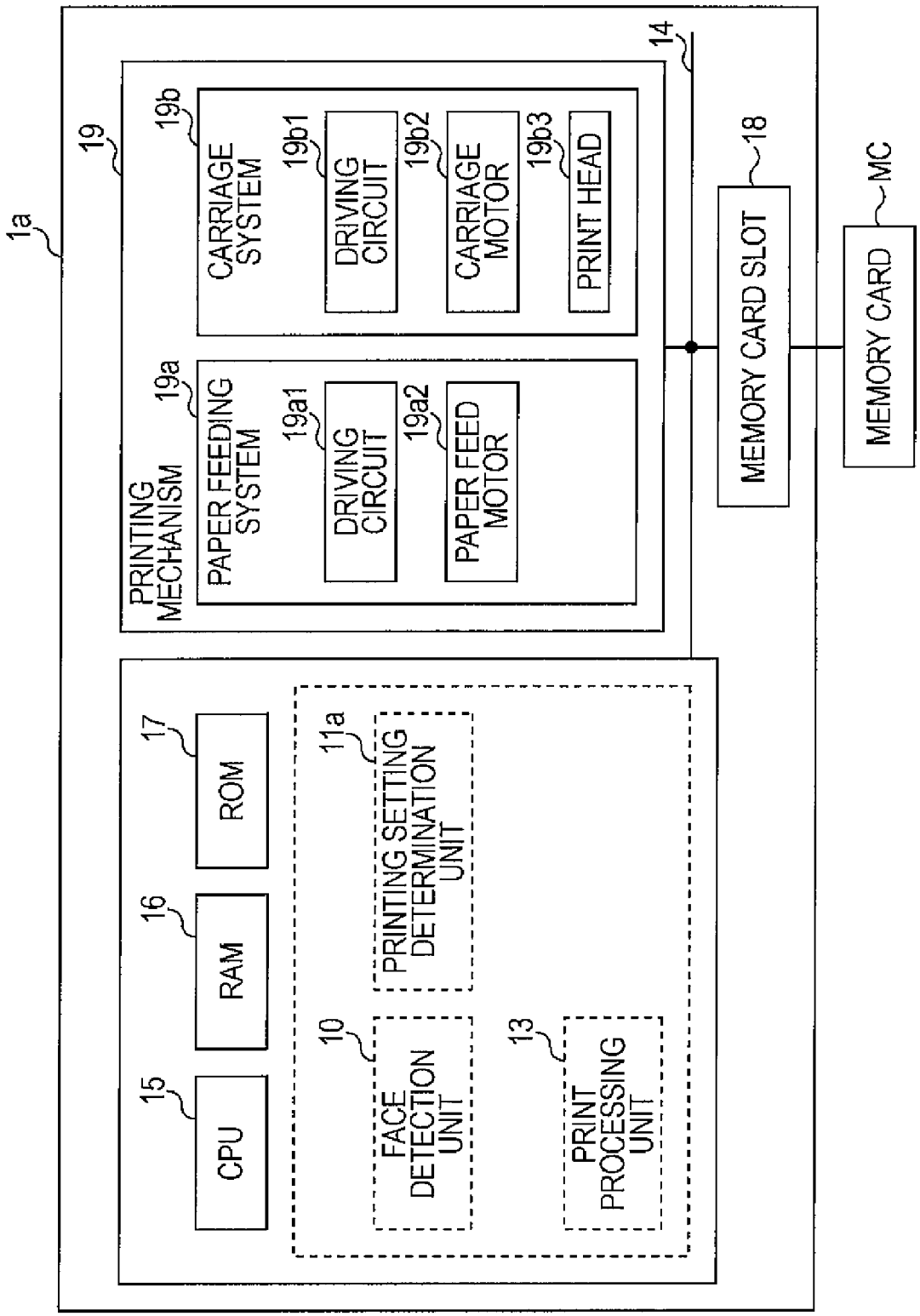
FIG. 1 is a diagram showing an outline of a function block of a printing device according to a first embodiment.

FIG. 1 is a diagram showing an outline of a printing device 1a. The printing device 1a is equipped with a CPU 15, a memory 16, and a ROM 17 connected to a bus 14, and is operated by execution of a program read from the ROM 17. The printing device 1a is so called a direct printer, and obtains an image of print target from a memory card MC inset in a memory card slot 18 and performs a marginless printing of the image. At the time, the printing device 1a determines a disposal mode (setting according to size of print image) in the marginless printing. Note that the printing device 1a may be a mini laboratory machine. Further, the printing device 1a is not limited to an independent device, and may be provided in a printer that actually performs printing or a device different from the printer (for example, an information processing device such as a computer connected to a printer). In this case, a printer driver or an application program installed in the information processing device (print setting determination device) such as a computer may determine the disposal mode to instruct the determined disposal mode to the printer as a printing device.

As a function unit constituting a software executed by the CPU, memory, or the like, the printing device 1a is equipped with a face detection unit 10, a print setting determination unit 11a, and a print processing unit 13. Note that each function unit may be provided by a dedicated hardware.

Further, the printing device 1a is equipped with a print mechanism 19 of, for example, an ink jet method as a constitution of hardware besides the bus 14, CPU 15, memory 17, and ROM 18. Needless to say, the invention can be applied also to another printing method. The print mechanism 19 is mainly constituted by a paper feeding system 19a and a carriage system 19b. The paper feeding system 19 includes a driving circuit 19a1 and a paper feed motor 19a2 as a main constitution. The carriage system 19b1 includes a driving circuit 19b1, a carriage motor 19b2, and a print head 19b3 as a main constitution. Hereinafter, each function unit will be described.

Figure 2A:
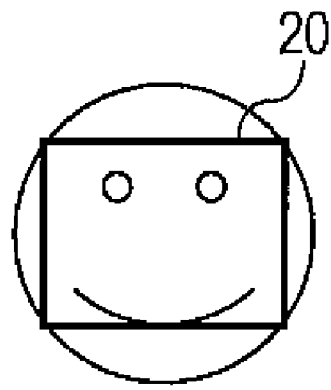
FIGS. 2A and 2B are each a diagram showing a concrete example of a face area.
Figure 2B:
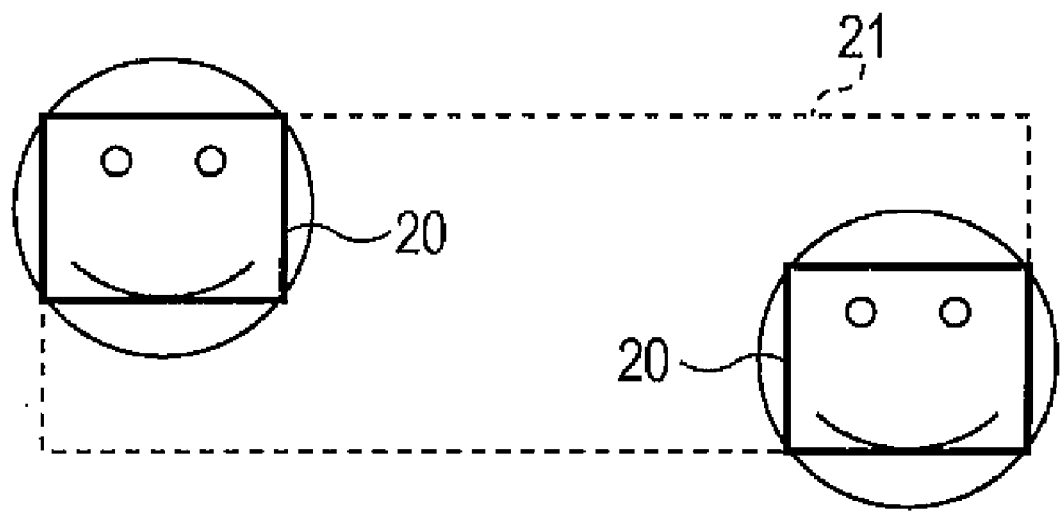

FIGS. 2A and 2B are each a diagram showing a content of a processing performed by the face detection unit 10. The face detection unit 10 obtains an image to be a target for printing from the memory card MC, and detects an area including a face of a person imaged on the image (hereinafter referred to as "face area") (see FIG. 2A). Note that the image of the embodiment shall be image data in which a number of pixels (unit: pixel) having color information of RGB multi tone are aligned in a matrix manner on a plane surface. The image to be a target for printing may be a photograph image imaged by a digital steel camera or the like, or may be an image obtained by performing a processing such as a trimming to the photograph image. Then, the face detection unit 10 specifies face area information showing the position, size, and the like of the detected face area. When a plurality of faces of persons are included in the image, the face detection unit 10 specifies the face area information for each face and specifies a face area 21 including each face area (see FIG. 2B). Note that in the following description for the first embodiment, the face area 20 and the face area 21 are simply referred to as "face area 20".

The face detection unit 10 performs a detection processing of the face area by using a known technique. For example, the face detection unit 10 preliminarily includes a template corresponding to outlines of entire face, and detects the face area by a template matching using the template. The face detection unit 10 may detect an area having skin color of person to detect the area as the face area.

Figure 3:
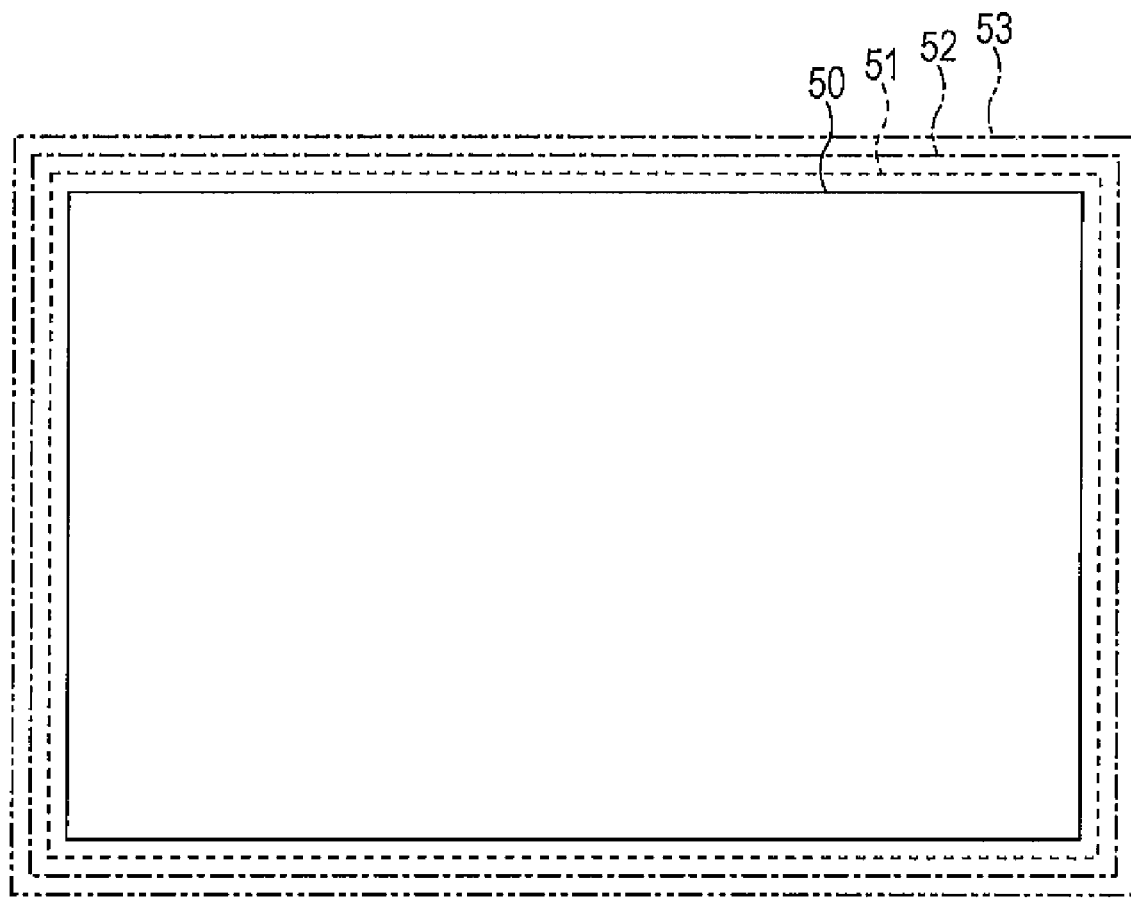
FIG. 3 is a diagram showing a concrete example of a disposal mode.

The print setting determination unit 11a determines the disposal mode. First, the disposal mode will be described. The disposal mode shows a setting according to a size of a print image used for marginless printing. FIG. 3 is a diagram showing an example of the disposal mode. In FIG. 3, a rectangle of a solid line is a frame (printing surface frame 50) showing a print paper on which printing is performed (corresponding to surface on which printing of the invention is performed). The size of the printing surface frame 50 corresponds to the size of a print paper such as L plate, 2L plate, A4, B5, or the like. In the marginless printing, it is ideal that the sizes of the printing surface frame 50 and the print image are matched. However, in consideration for a positioning error caused by the print mechanism 19, a lager print image is preliminarily prepared, and the print image is printed on a print paper whose size is slightly smaller than the print image. Herewith, even when a positioning error is occurred by the print mechanism 19, it can be prevented that an area in which no printing is performed is formed in an outer margin of the print paper. Note that the allowance level of the positioning error becomes larger as the size of the print image becomes larger than the printing surface frame 50.

In FIG. 3, a rectangle shown by a broken line is a frame (first print image frame 51) showing a size of a print image (first print image) having a first size. The first print image can be obtained by magnifying the size of the printing surface frame 50 by a first magnification ratio. In FIG. 3, a rectangle shown by a long chain line is a frame (second print image frame 52) showing a size of a print image (second print image) having a second size. The second print image can be obtained by magnifying the size of the printing surface frame 50 by a second magnification ratio larger than the first magnification ratio. In FIG. 3, a rectangle shown by a long two dot chain line shows a frame (third print image frame 53) showing a size of a print image (third print image) having a third size. The third print image can be obtained by magnifying the image having the size of the printing surface frame 50 by a third magnification ratio larger than the second magnification ratio.

The disposal mode includes a no magnification mode, a first mode, a second mode, and a third mode. In the case of no magnification mode, a marginless printing using a print image converted in size to be the same size as the printing surface frame 50 is performed. In the case of the first mode, second mode, and third mode, marginless printing using print images converted in size so as to match the first print image frame 51, second print image frame 52, and third print image frame 53 are respectively performed.

Next, a determination process performed by the print setting determination unit 11a will be described. The print setting determination unit 11a judges whether or not the face area 20 overlaps a differential area (disposal area) between the print image frame 51 to 53 and the printing surface frame 50. In the case when the face area 20 overlaps the disposal area, a disposal mode corresponding to the print image frame whose magnification is lower is determined. Further, in the case where the face area 20 overlaps the disposal area even when using the print image frame whose magnification ratio is the lowest (in this case, the first print image frame 51), the print setting determination unit 11a determines the setting of marginless printing to the no magnification mode.

A concrete method of the judgment of whether or not the face area 20 overlaps the disposal area performed by the print setting determination unit 11a may be appropriately designed. For example, when at least a part of the face area 20 overlaps the disposal area, the print setting determination unit 11a may judges that the face area 20 overlaps the disposal area. Alternatively, when a size of a part of the face area overlapping the disposal area exceeds a threshold value (for example, provided by the ratio of the face area such as 10%, 20%, or the like, or a number of pixels such as 20 pixels, 100 pixels, or the like), the print setting determination unit 11a may judge that the face area 20 overlaps the disposal area. Alternatively, the print setting measurement unit 11a may judge that the face area 20 overlaps the disposal area only when the entire of the face area 20 is included in the disposal area.

Figure 4:
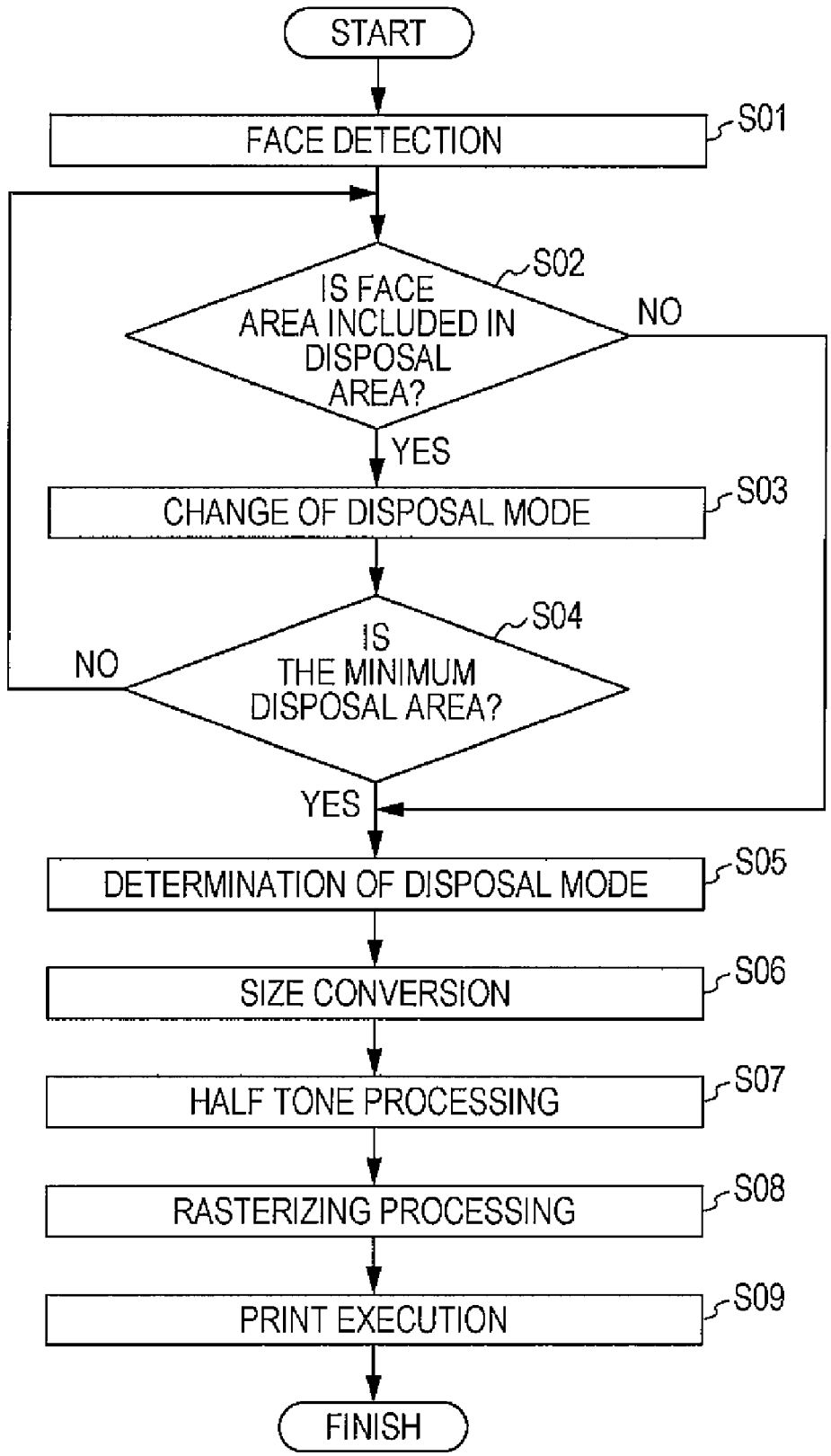
FIG. 4 is a flow chart showing an operation example of the printing device according to the first embodiment.

FIG. 4 is a flow chart showing an operation example of the printing device 1a. First, the face detection unit 10 detects a face by using an image to be a target for printing (S01). The print setting determination unit 11a judges whether or not the face area overlaps the disposal area corresponding to the disposal mode set at the moment (S02). When the print setting determination unit 11a judges that the face area overlaps the disposal area (YES in S02), the print setting determination unit 11a changes the disposal mode to the disposal mode for the print image smaller than the print image set in the moment (S03). Then, the print setting measurement unit 11a judges whether or not the new disposal mode is for the minimum disposal area (in the embodiment, "no magnification mode") (S04). When the new disposal mode is not for the minimum disposal area, the process goes back to S02 (No in S04).

When the face area is not overlapped with the disposal area in the branch of S02 (NO in S02), or when the new disposal mode is the disposal mode for the minimum disposal area (YES in S04), the print setting determination unit 11a determines the disposal mode set at the moment as the final selection selected by the printing device 1a (S05).

Next, the print processing unit 13 obtains an image of print target and performs a processing for printing the image with the print mechanism 19. First, the print processing unit 13 converts the image of print target to have a size suited for printing (S06). The size conversion means to create a print image so that the number of vertical and lateral pixels of the image of print target becomes the number of pixels for printing by performing interpolation or skipping of pixel. Note that the number of pixels for printing can be obtained by multiplying the physical size of the print image to be created and the print resolution (for example, 1440 dpi). In the embodiment, the size of the print image which should be created is set in accordance with the disposal mode already set (S05). That is, when the no magnification mode is selected, the print image whose size is the same as the printing surface frame 50 is created, when the first mode is selected, the print image whose size is the same as the first print image frame 51 is created, when the second mode is selected, the print image whose size is the same as the second print image frame 52 is created, and when the third mode is selected, the print image whose size is the same as the third print image frame 53 is created.

When the print image is created in this manner, the print processing unit 13 performs a known half tone processing to the print image (S07). Further, the print processing unit 13 performs a known rasterizing processing (processing for dividing the print image after the half tone processing into paths that are main-scanned by the print head 19b3, or assigning the print image to each nozzle equipped in the print head 19b3) (SOS). Then, by outputting the data after rasterizing processing to the driving circuits 19a1, 19b1, the paper feed motor 19a2, the carriage motor 19b2, and print head 19b3 are driven and controlled (S09). Herewith, the print head 19b3 can be main-scanned by the carriage motor 19b2 for each time the print paper is transported (sub scanning) by driving the paper feed motor 19a2. The print image can be recreated on the print paper by ejecting ink toward the print paper from the print head 19b3 in each main scanning.

Figure 5A:
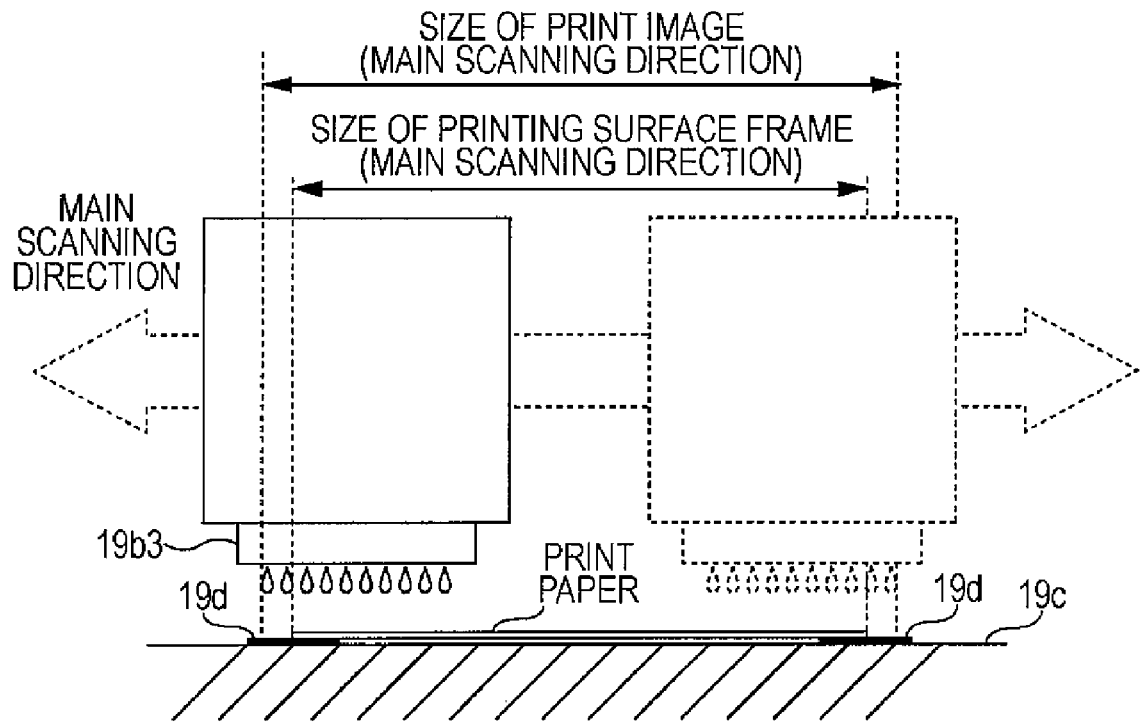
FIGS. 5A and 5B are each a diagram schematically showing an appearance of printing.

FIG. 5A is a diagram schematically showing an appearance when printing is performed on the print paper. The printing device 1a includes a platen 19c at a position opposing the print head 19b3, and the print paper is fed on the platen 19c. The print head 19b3 ejects an ink drop from a nozzle while being main-scanned in the direction (paper surface lateral direction) perpendicular to the paper feeding direction (direction perpendicular to the paper surface). As described above, since the print image is larger than the print paper as for the main scanning except the no magnification mode, an ink drop is to be ejected in the area outside the print paper and inside the print image (disposal area). Since an ink absorption member 19d is equipped on the platen 19c near an end of the print paper, the ink ejected in the disposal area is absorbed thereby.

Figure 5B:
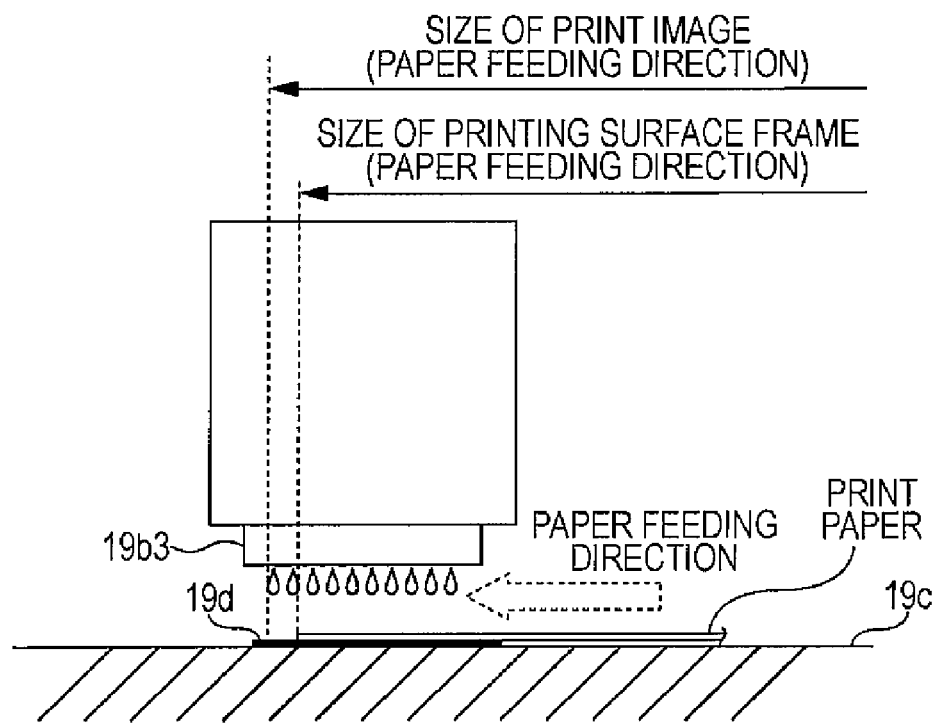

FIG. 5B is a diagram showing an appearance (head of the print paper) in witch printing is performed on the print paper viewed from a side of paper transport direction. As described above, since the print image becomes larger the print paper also as for the paper feeding direction (paper surface lateral direction) except the no magnification mode, an ink drop is to be ejected in the area (disposal area) outside the print paper and inside the print image. That is, an ink drop is to be ejected from a nozzle of the print head 19b3 between a while before the head of the print paper is reached just below the print head 19b3 and a while after the bottom of the print paper is apart from just below the print head 19b3. Note that since the ink absorption member 19d is equipped on the platen 19c also near the position opposing the print head 19b3, the ink ejected in the disposal area is absorbed thereby.

When there is a fear that a face of a person is included in the disposal area, that is, the face area overlaps the disposal area, the disposal mode whose magnification ratio is low is selected by using the printing device 1a constituted in this manner. The disposal area becomes smaller as the magnification ratio becomes lower. Consequently, it becomes possible to reduce or eliminate a portion in which a face of a person is overlapped with the disposal area to restrain that a face of a person to be printed is lacked.

Modifications

Figure 6:
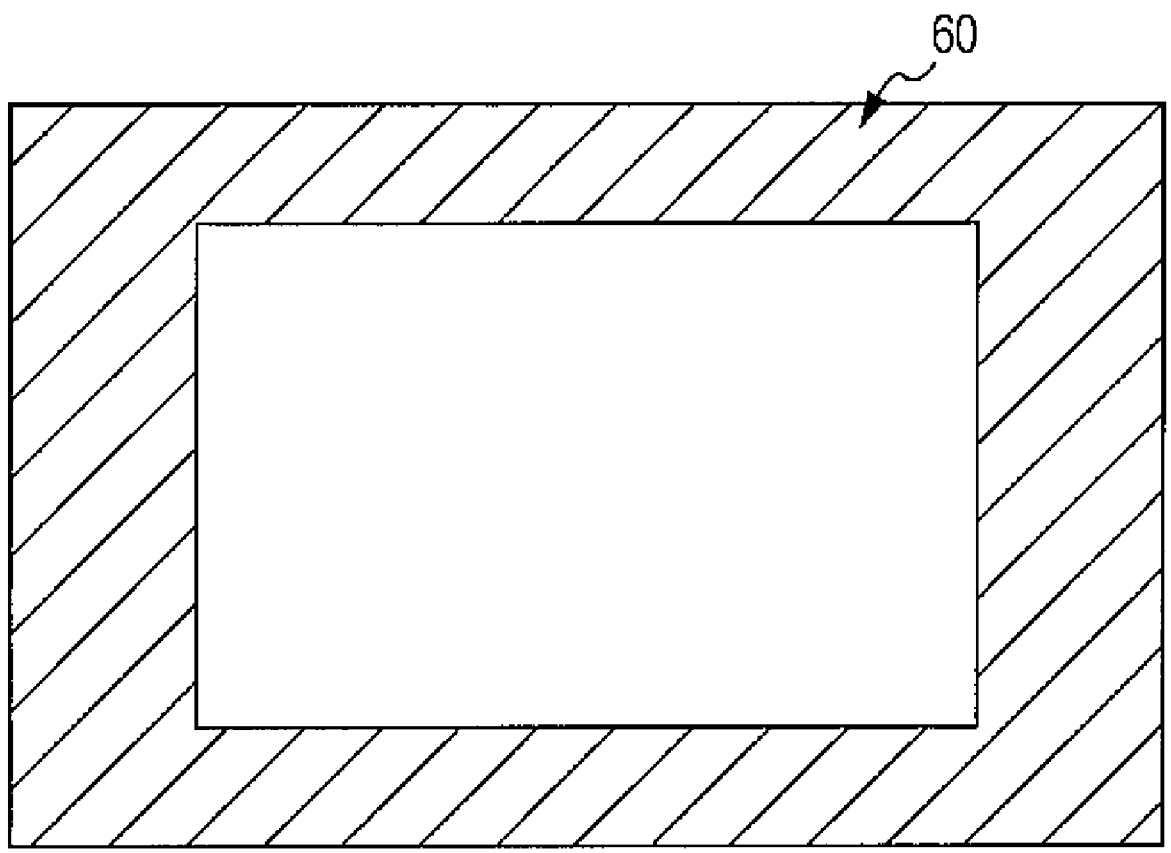
FIG. 6 is a diagram showing a concrete example of a face detection target area.

The face detection unit 10 may perform a face detection processing not to the entire image to be a target for printing but to only a part thereof. FIG. 6 is a diagram showing an example of a part to which the face detection unit 10 performs a face detection processing. In FIG. 6, an outside frame shows an outer frame of an image to be a target for printing. In FIG. 6, the portion of oblique lines shows an area (face detection target area 60) to which the face detection unit 10 performs a face detection processing. The face detection area 60 includes near the marginal portion of the image to be a target for printing. The size and the shape of the face detection target area 60 are appropriately set by a designer. In FIG. 6, the face detection target area 60 is set to include near the every margin of the four sides. However, the face detection target area 60 may be set to include only near the marginal portion of any one side, two sides, three sides, or may be set to include near the marginal portion of the upper half of the image, or may be set to include near the marginal portion of the lower half of the image.

With the structure, a time required for performing the face detection processing can be reduced. Further, the possibility that a face having the face area 20 that is overlapped with the disposal area exists is higher in near the margin of the image than the center of the image. Accordingly, even when the face detection target area 60 is set in this manner, it can be restrained that detection of a face having the face area overlapped with the disposal area is missed regardless of existence thereof and false determination of disposal mode is performed.

The print setting determination unit 11a may be constituted to determine a value of a magnification ratio for obtaining a print image from an image to be a target for printing instead of selecting the disposal mode. For example, the print setting determination unit 11a may calculate the magnification ratio by dividing the distance between the face area and the margin of the image by the length of the image extending in the distance direction. Further, the print setting determination unit 11a may be constituted to determine a value of a width of the disposal area instead of selecting the disposal mode. For example, the print setting determination unit 11a may calculate the width as a distance between the face area and the margin of the image. Further, the print setting determination unit 11a may be constituted to calculate the magnification ratio or the width and select the disposal mode corresponding to the calculated value.

Second Embodiment

Figure 7:
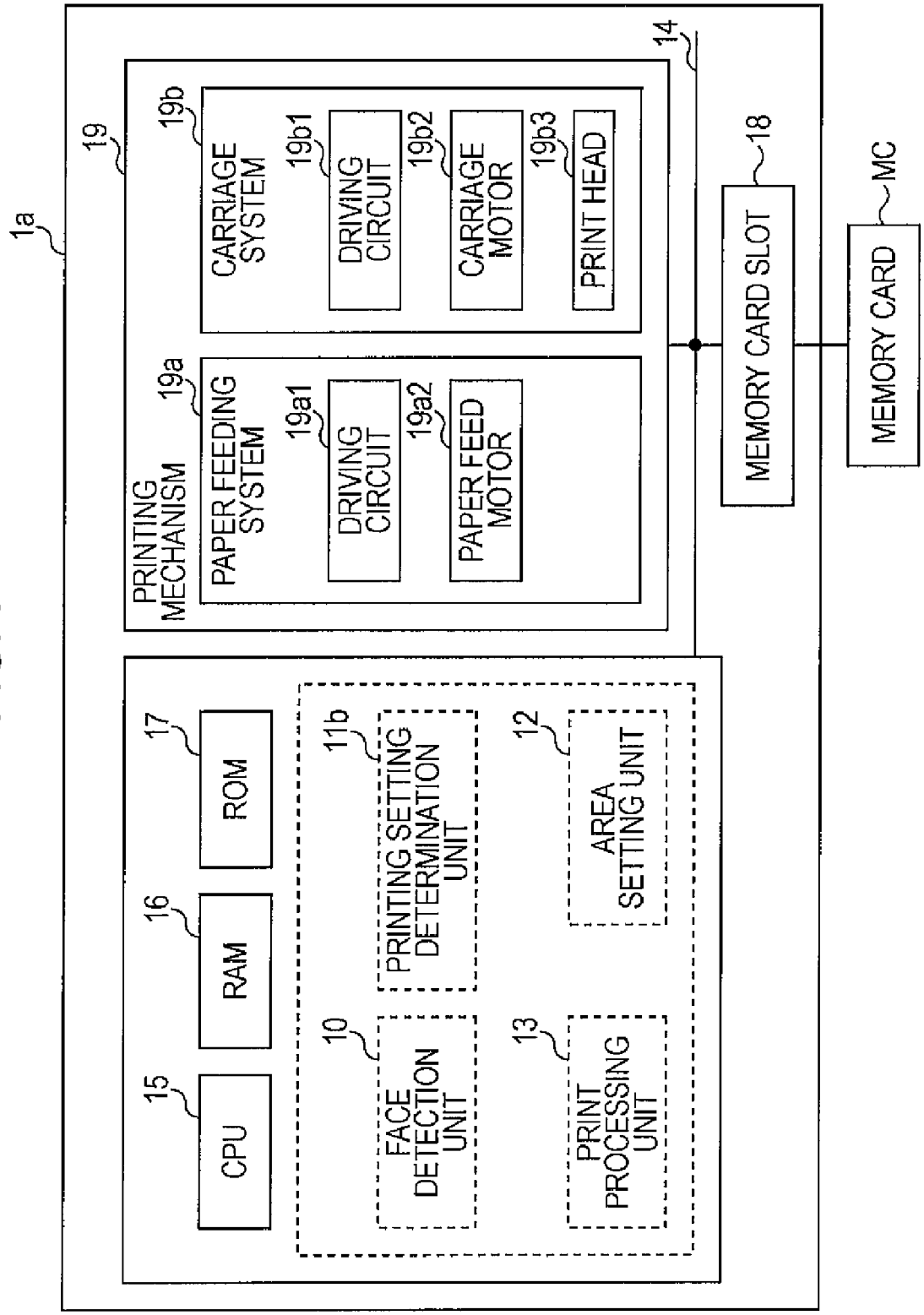
FIG. 7 is a diagram showing an outline of a function block of a printing device according to a second embodiment.

FIG. 7 is a diagram showing an outline of a function block of a printing device 1b. The printing device 1b is different from the printing device 1a in the following constitution. That is, the printing device 1b is equipped with a print setting determination unit 11b and an area setting unit 12 instead of the print setting determination unit 11a and the print processing unit 13. Hereinafter, the part of the constitution of the printing device 1b different from that of the printing device 1a will be described.

The area setting unit 12 sets a protection area 30 based on the face area 20 detected by the face detection unit 10. The protection area 30 is an area that includes a part of a face included in the face area 20 and an area different from the face area 20. The protection area 30 is an area including a portion that should be printed. Definition of the portion that should be printed is appropriately performed by each designer.

Figure 8A:
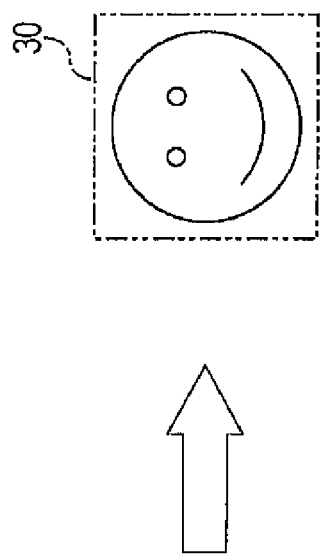
FIGS. 8A and 8B are each a diagram showing a concrete example of a protection area.
Figure 8A:
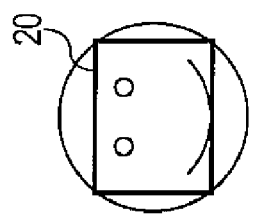
Figure 8B:
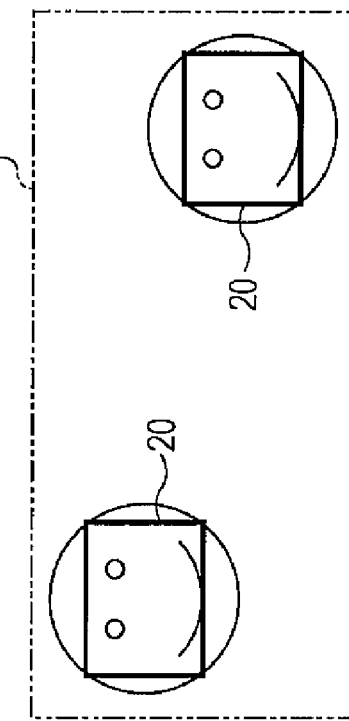
Figure 8B:
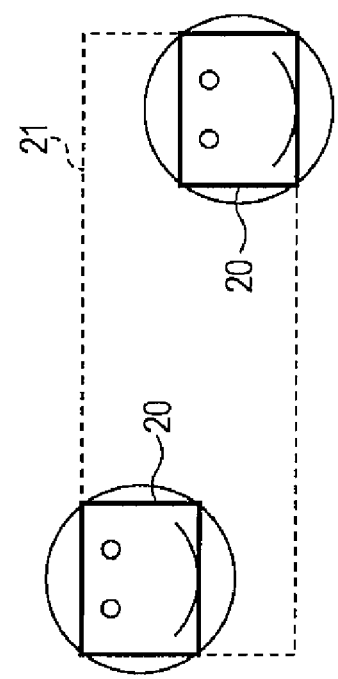

FIGS. 8A and 8B are each a diagram showing a setting example of the protection area 30. In FIGS. 8A and 8B, the protection area 30 is an area including the entire of the face included in the face area 20. The area setting unit 12 sets the protection area 30 by magnifying the face area 20 with a predetermined width or magnification ratio in each of the vertical and lateral directions (see FIG. 8A). Further, when a plurality number of faces of persons are detected, the area setting unit 12 sets the protection area 30 by magnifying the face area 21 with a predetermined width or magnification ratio (see FIG. 8B).

The print setting determination unit 11b performs the processing by using the protection area 30 instead of the face area 20 or the face area 21. The other processing performed by the print setting determination unit 11b is the same as the processing performed by the print setting determination unit 11a.

Figure 9:
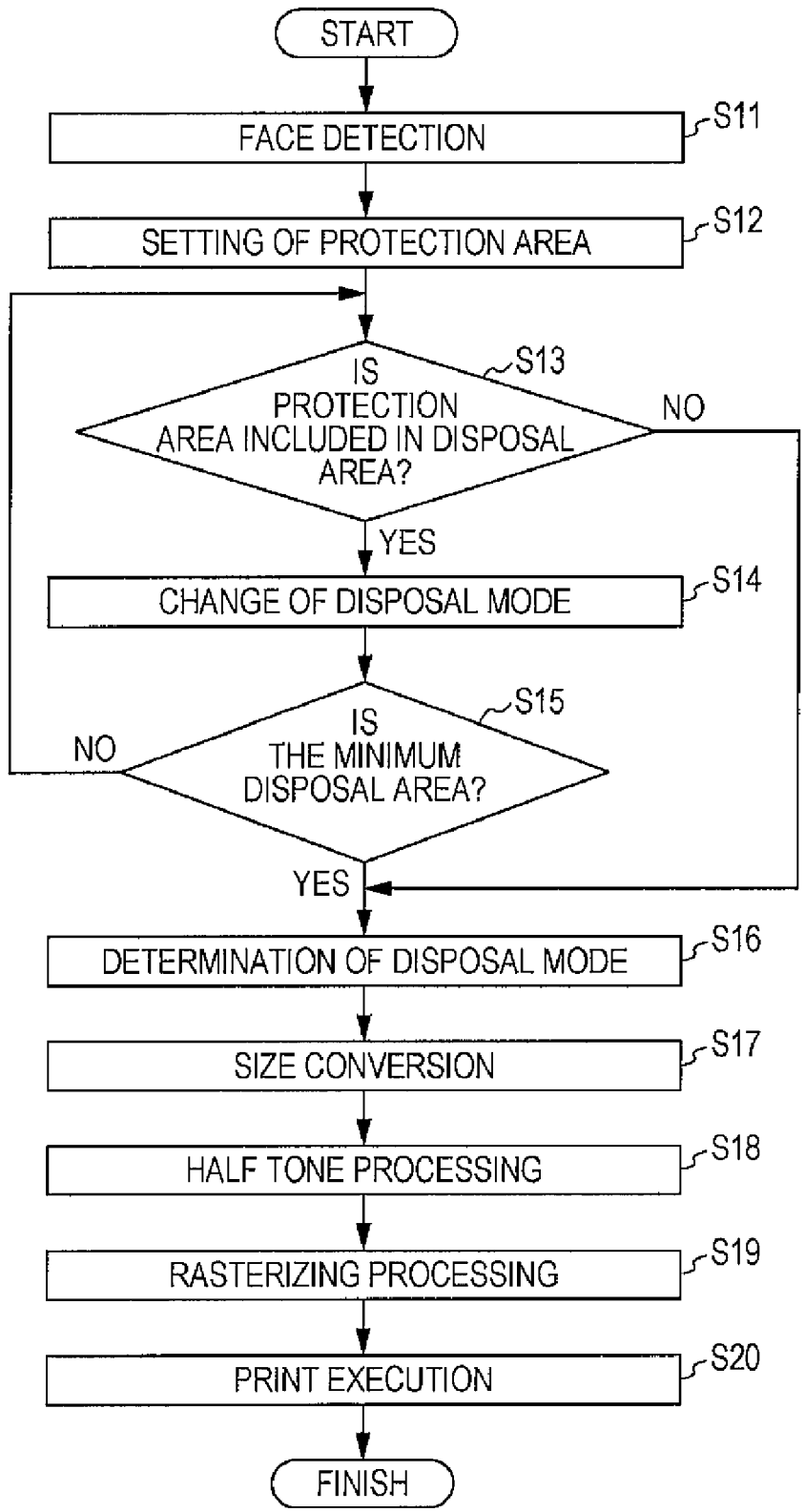
FIG. 9 is a flow chart showing an operation example of the printing device according to the second embodiment.
Figure 10:
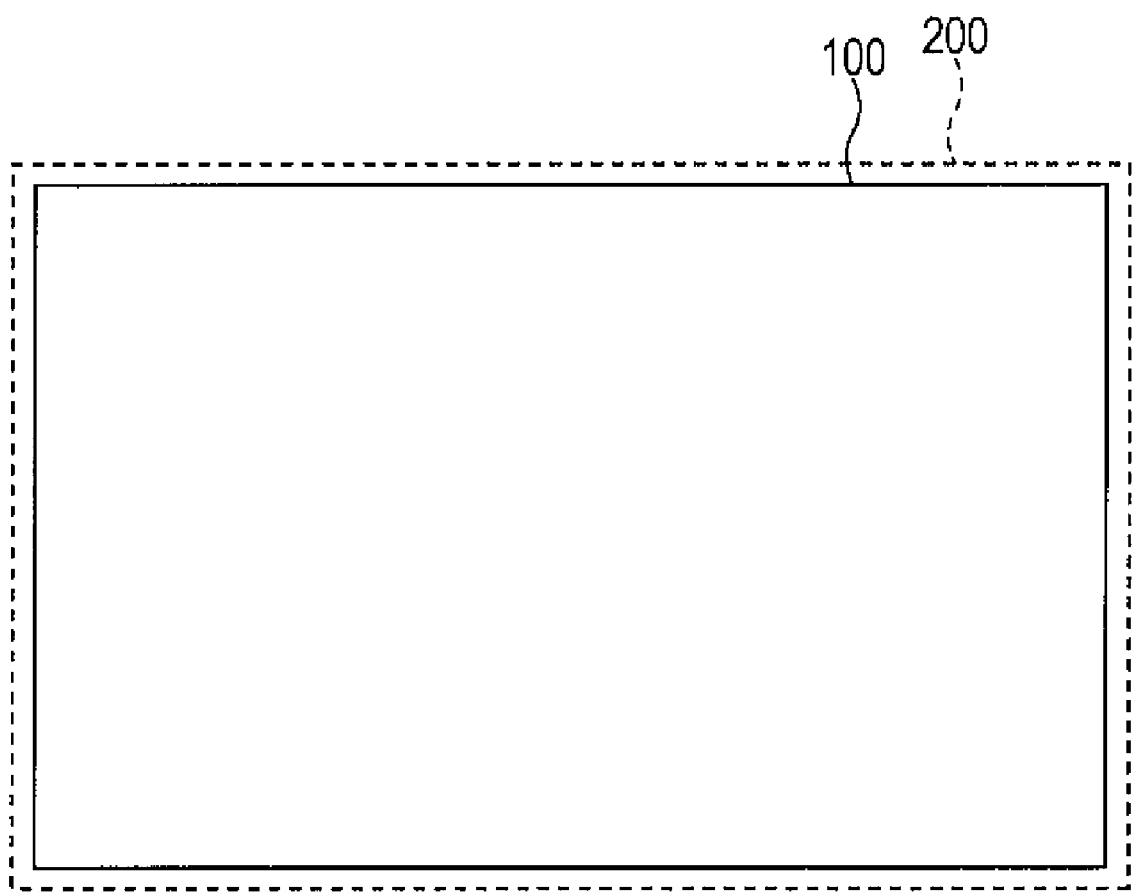
FIG. 10 is a diagram schematically showing a marginless print processing according to a conventional technique.

FIG. 9 is a flow chart showing an operation example of the printing device 1b. First, the face detection unit 10 performs detection of a face by using an image to be a target for printing (S11). The area setting unit 12 sets a protection area based on face area information (S12). The print setting determination unit 11b judges whether or not the protection area overlaps the disposal area corresponding the disposal mode that is set at the moment (S13). When the print setting determination unit 11b judges that the protection area overlaps the disposal area (YES in S13), the print setting determination unit 11b changes the disposal mode to the disposal mode for a print image smaller than the print image set at the moment (S14). Then, the print setting determination unit 11b judges whether or not the new disposal mode is the mode for the minimum disposal area (in the embodiment, "no magnification mode") (S15). When the new disposal mode is not the mode for the minimum disposal area, the process goes back to S13 (NO in S15).

In the branch of S13, when the protection area does not overlap the disposal area (NO in S13), or when the new disposal mode is the mode for the minimum disposal area in the branch of S15 (YES in S15), the print setting determination unit 11b determines the disposal mode that is set at the moment as a final selection by the printing device 1b (S16). The following processing (S17 to S20) is the same as that of the first embodiment (S06 to S09).

Modifications

The size or the position of the face area 20 is different depending on a face detecting algorism employed in the face detection unit 10, a mounting method thereof, or the like. Accordingly, the setting method in which the protection area 30 is set by the area setting unit 12 based on the face area 20 is appropriately set in accordance with the size, the position, the shape, or the like of the face area 20. For example, as in FIGS. 8A and 8B, in the case where the face area 20 is smaller than the real face of person, the area setting unit 12 sets the protection area 30 by magnifying the face area as described above. On the other hand, in the case where the face area 20 is larger than the real face of person, the area setting unit 12 may set the protection area 30 by reducing the face area. Further, the area setting unit 12 may set the protection area by shifting or by deforming the face area.

It is not necessary the case that the entire parts of face or head is included in the protection area 30. The protection area 30 may be appropriately set by a designer. For example, the protection area 30 may be set as an area including both eyes, nose, and mouth. That is, a designer may judge a part which is inconvenient to be included in the disposal area to set the protection area 30 depending on the judged result.

Further, the printing device 1b may be modified in accordance with each modification in the printing device 1a.

Note that a part or the entire of the printing devices 1a, 1b of the embodiments may be provided by a computer. In this case, a program for providing the print setting determination function may be recorded in a recording medium that can be read by the computer, and the program recorded in the recording medium may be read and executed by a computer system. Note that the "computer system" shall include hardware such as an OS, peripheral equipment, or the like. Further, "recording medium that can be read by the computer" is a portable medium such as a flexible disc, an optical magnetic disc, a ROM, a CD-ROM, or the like, and a recording device such as a hard disc mounted in the computer system. Further, "recording medium that can be read by the computer" may also include the one that dynamically holds a program during a short period as a communication line in the case of transmitting a program via a network such as the internet or a communication line such as a telephone circuit, and the one that holds the program for a certain period such as a volatile memory in the computer system that becomes a server or a client in the case. Further, the program may be the one that provides a part of the function, or may be the one that provides the function by the combination with a program already recorded in the computer system.

The embodiments of the invention are described above in detail with reference to the accompanying drawings. However, the concrete structure is not limited to those of the embodiments, and a design or the like is also included in the invention without departing from the gist thereof.

The present application claims the priority based on a Japanese Patent Application No. 2009-035801 filed on Feb. 18, 2009 and No. 2008-094957 filed on Apr. 1, 2008, the disclosure of which is hereby incorporated by reference in its entirety.

What is claimed is:

1. A printing device comprising:
   a face detection unit for detecting a face area including a face of a person in an image to be a target for printing; and
   a print setting determination unit for determining a setting of a size of a print image used for a marginless printing based on a position of the face area detected by the face detection unit,
   wherein the print setting determination unit determines the setting so that a size of an overlapped portion of the face area detected by the face detection unit and a disposal area which is a differential area of the print image and a surface on which printing is performed becomes small.

2. The printing device according to claim 1, wherein the print setting determination unit determines the setting of the size of the print image as a size closer to a size of the surface on which printing is performed when the face area detected by the face detection unit is included in the disposal area of the print image having a certain size.

3. The printing device according to claim 1, further including:
   an area setting unit for setting a protection area including a portion which should be printed based on a size of the face area, wherein
   the print setting determination unit determines the setting based on a position of the protection area instead of the position of the face area.

4. The printing device according to claim 1, wherein
   the face detection unit performs a detection processing only for a part area of the image to be a target for printing, the part area including near a margin of the image.

5. A printing method comprising:
   detecting a face area including a face of a person in an image to be a target for printing by a computer; and
   determining a setting of a size of a print image used for a marginless printing based on a position of the detected face area by the computer,
   wherein the setting is determined so that a size of an overlapped portion of the face area detected and a disposal area which is a differential area of the print image and a surface on which printing is performed becomes small.

6. A computer program embodied on a non-transitory computer-readable medium causing a computer to execute:
   detecting a face area including a face of a person in an image to be a target for printing;
   determining a setting of a size of a print image used for a marginless printing based on a position of the detected face area,
   wherein the setting is determined so that a size of an overlapped portion of the face area detected and a disposal area which is a differential area of the print image and a surface on which printing is performed becomes small.

7. A print setting determination device, comprising:
   a face detection unit for detecting a face area including a face of a person in an image to be a target for printing; and
   a print setting determination unit for determining a setting of a size of a print image used for a marginless printing based on a position of the face area detected by the face detection unit,
   wherein the print setting determination unit determines the setting so that a size of an overlapped portion of the face area detected by the face detection unit and a disposal area which is a differential area of the print image and a surface on which printing is performed becomes small.

* * * * *